United States Patent
Hellkvist et al.

(10) Patent No.: US 10,009,188 B2
(45) Date of Patent: Jun. 26, 2018

(54) METHODS AND NODES FOR DISTRIBUTION OF CONTENT TO CONSUMERS

(71) Applicant: Telefonaktiebolaget L M Ericsson (publ), Stockholm (SE)

(72) Inventors: Stefan Hellkvist, Stockholm (SE); Joacim Halén, San Jose, CA (US); Jan-Erik Mångs, Solna (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 163 days.

(21) Appl. No.: 14/779,363

(22) PCT Filed: Mar. 25, 2013

(86) PCT No.: PCT/EP2013/056278
§ 371 (c)(1),
(2) Date: Sep. 23, 2015

(87) PCT Pub. No.: WO2014/154238
PCT Pub. Date: Oct. 2, 2014

(65) Prior Publication Data
US 2016/0036599 A1    Feb. 4, 2016

(51) Int. Cl.
*H04L 12/18* (2006.01)
*H04L 12/761* (2013.01)

(52) U.S. Cl.
CPC .......... *H04L 12/18* (2013.01); *H04L 12/185* (2013.01); *H04L 12/1886* (2013.01); *H04L 45/16* (2013.01)

(58) Field of Classification Search
CPC ..... H04L 12/18; H04L 45/16; H04L 12/1886; H04L 12/185
See application file for complete search history.

(56) References Cited

U.S. PATENT DOCUMENTS

2005/0289648 A1* 12/2005 Grobman ............... G06F 21/53
                                                            726/12
2009/0073894 A1*  3/2009 Nimon ................. H04L 12/18
                                                            370/254

(Continued)

FOREIGN PATENT DOCUMENTS

CN    101035057 A    9/2007
CN    101202749 A    6/2008
(Continued)

OTHER PUBLICATIONS

Unknown, Author, "Dijkstra's algorithm", Wikipedia, the free encyclopedia, accessed May 23, 2013, 1-8.
(Continued)

*Primary Examiner* — Mohammad Adhami
*Assistant Examiner* — Shailendra Kumar
(74) *Attorney, Agent, or Firm* — Murphy, Bilak & Homiller, PLLC

(57) ABSTRACT

Methods and nodes (200, 202) in a data distribution network, for distributing content to multiple consuming nodes (C1, C2, C3, ... ). A first node (200) detects (2:2) multiple data flows (2:1b) of a first content from the first node to a second node (202) in the distribution network, when the first node operates as delivering node of the first content for the consuming nodes. The first node then instructs (2:4) the second node to operate as delivering node of the first content for the consuming nodes and redirects (2:5) the consuming nodes to use the second node as delivering node of the first content. The first node further reduces (2:6) the multiple data flows to a common data flow of the first content to the second node. Thereby, efficiency can be improved in the data distribution network by reducing the number of data flows between the first and second nodes.

18 Claims, 6 Drawing Sheets

(56) References Cited

U.S. PATENT DOCUMENTS

| | | | |
|---|---|---|---|
| 2010/0172354 A1* | 7/2010 | Lee | H04L 12/1854 370/390 |
| 2011/0243131 A1* | 10/2011 | Amir | H04L 45/16 370/390 |
| 2013/0246588 A1* | 9/2013 | Borowicz | H04L 41/08 709/220 |
| 2014/0067758 A1* | 3/2014 | Boldyrev | H04L 67/1097 707/610 |
| 2014/0195675 A1* | 7/2014 | Silver | H04L 65/1083 709/224 |
| 2017/0134534 A1* | 5/2017 | Glasser | H04L 69/08 |

FOREIGN PATENT DOCUMENTS

| | | |
|---|---|---|
| CN | 101420375 A | 4/2009 |
| WO | 9959291 A1 | 11/1999 |
| WO | 0221301 A1 | 3/2002 |

OTHER PUBLICATIONS

Unknown, Author, "JSON", Wikipedia, the free encyclopedia, accessed May 23, 2013, 1-11.

Unknown, Author, "Representational state transfer", Wikipedia, the free encyclopedia, accessed May 23, 2013, 1-8.

* cited by examiner

METHODS AND NODES FOR DISTRIBUTION OF CONTENT TO CONSUMERS

TECHNICAL FIELD

The present disclosure relates generally to methods and nodes in a data distribution network, for distributing content to multiple consuming nodes connected to the network.

BACKGROUND

In the field of data handling, clients such as different service providers, companies, enterprises, organizations and authorities have a need for hardware and software resources in order to create infrastructure for various internet or web applications. In this field, the term "resources" is often used for short to represent any hardware and software that can be used for computer executed operations when providing such applications including data processing, calculations, compilations and data storing.

In traditional solutions, the clients themselves own and maintain all the resources they need which can be quite costly and time-consuming, though, also requiring considerable knowledge to acquire and install such resources which further may quickly become out-of-date due to the current rapid development of new techniques and products. Another problem is that a client may need a great amount of resources for a very limited period, while very little resources are used otherwise. The client thus has to make investments in resources enough to cope with such temporary peak usage.

In recent years, the concept of cloud computing has emerged to solve the above problems for clients who instead can utilize pooled resources maintained by cloud providers in large data centers with a huge range of computers and data storages. Effectively, all the needed resources and capacity are available from the cloud provider and the clients do not have to make their own investments in costly resources. A client is thus able to contact a cloud provider to create a so-called "Virtual Machine" (VM) comprising resources allocated in the cloud as needed and required by the client who can then use the VM basically in the same way as if corresponding resources were owned and hosted by the client himself. The benefits for clients with cloud computing thus include reduced costs for investments and maintenance, and greater flexibility and scalability of the resources as needed. There are also solutions with distributed cloud where the resources are hired from multiple private nodes and devices, thus offloading the central data centers.

For services involving delivery of content to consumers, e.g. audio/video media, images, web pages and notifications, the amount of data to deliver may be substantial and it has become generally desirable to reduce the amount of data traffic and the latency in data distribution networks used for transporting such data to the consumers when delivering requested content. Therefore, solutions have been developed where the content is delivered from a plurality of nodes located more close to the receiving consumer, instead of all the way from a single centralized service node, the nodes thus forming a distributed content delivery network. This arrangement can be regarded as a distributed cloud of content delivering resources. The delivery path between content source and consumer can thus be shortened and load is distributed over several nodes which may work as caches for temporary storage of highly demanded content. This may also reduce the latency, i.e. waiting time, in the network. In this way, content can be delivered to consumers faster and with increased efficiency.

However, the above-described de-centralized solution for content delivery is somewhat static and a considerable amount of manual work is required to establish and configure suitable nodes for delivering a certain content. For example, it may be necessary to agree with node owners and operators where to arrange the delivering nodes, and to configure them for achieving the needed networking functionality. Moreover, if the demands for content change, the selection and configuration of the delivering nodes must be adapted accordingly, requiring further manual work, to preserve the positive effects of efficient content delivery, low traffic load and reduced latency mentioned above. Unless such manual work is spent on selecting and configuring suitable delivering nodes according to changing demands for content, a setup of distributed delivering nodes will soon enough become out of date and lose its efficiency. As a result, more resources and bandwidth will be utilized in the network than necessary.

SUMMARY

It is an object of embodiments described herein to address at least some of the problems and issues outlined above. It is possible to achieve this object and others by using methods and nodes as defined in the attached independent claims.

According to one aspect, a method is performed by a first node in a data distribution network, for distributing content to multiple consuming nodes connected to the data distribution network. In this method, the first node detects multiple data flows of a first content from the first node to a second node in the distribution network, when the first node operates as delivering node of the first content for the consuming nodes. The first node then instructs the second node to operate as delivering node of the first content for the consuming nodes and redirects the consuming nodes to use the second node as delivering node of the first content. The first node further reduces the multiple data flows to a common data flow of the first content to the second node.

In this way, the multiple data flows of the same content over a link between the first and second nodes will be reduced to a single common data flow that is sufficient to get the needed data across this link. This has been achieved by delegating the function of delivering node from the first node to the next downstream node, i.e. the second node. The efficiency has thereby been improved in the data distribution network since the content is delivered to all consuming nodes with less occupation of resources, reduced latency and shorter communication path between delivering node and consuming nodes, as compared to having the multiple data flows of the same content between the first and second nodes.

According to another aspect, a first node is provided in a data distribution network. The first node is configured to distribute content to multiple consuming nodes connected to the data distribution network and comprises a delivery unit adapted to send data flows with content over the distribution network. The first node also comprises a detecting unit adapted to detect multiple data flows of a first content from the first node to a second node in the distribution network when the first node operates as delivering node of the first content for the consuming nodes. The first node further comprises an instructing unit adapted to instruct the second node to operate as delivering node of the first content for the consuming nodes, and a redirecting unit adapted to redirect the consuming nodes to use the second node as delivering node of the first content. In the first node, the delivery unit is also adapted to reduce the multiple data flows to a common data flow of the first content to the second node.

According to yet another aspect, a method is performed by a second node in a data distribution network, for distributing content to multiple consuming nodes connected to the data distribution network. In this method, the second node receives an instruction from a first node in the data distribution network to operate as delivering node of a first content for the consuming nodes when multiple data flows of the first content to the second node have been detected in the first node. The second node then operates as delivering node of the first content by sending multiple data flows to the consuming nodes while a common data flow of the first content is received from the first node.

According to yet another aspect, a second node is provided in a data distribution network, the second node being configured to distribute content to multiple consuming nodes connected to the data distribution network. The second node comprises a receiving unit which is adapted to receive an instruction from a first node in the data distribution network to operate as delivering node of a first content for the consuming nodes when multiple data flows of the first content to the second node have been detected in the first node. The second node also comprises an operating unit adapted to operate as delivering node of the first content by sending multiple data flows to the consuming nodes while a common data flow of the first content is received from the first node.

The above methods and nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
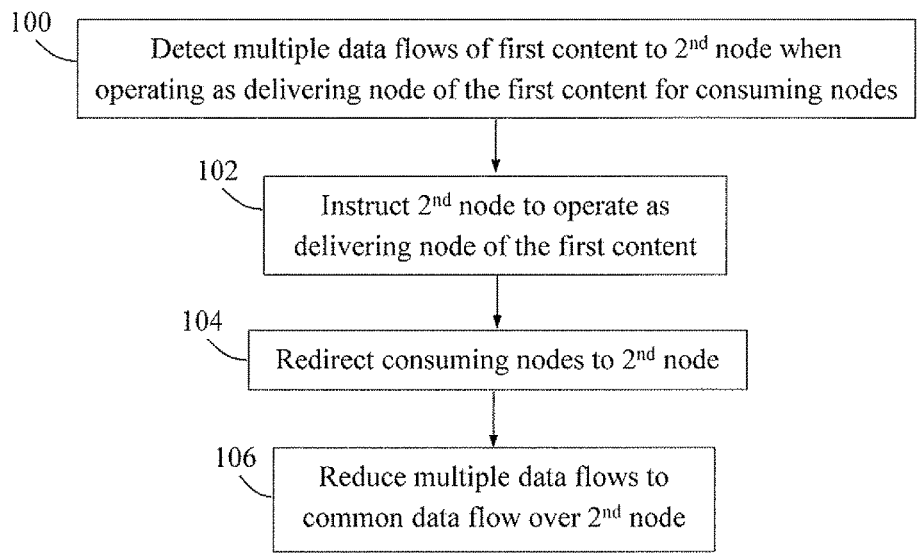
FIG. 1 is a flow chart illustrating a procedure in a first node of a data distribution network, according to some possible embodiments.

Briefly described, a solution is provided to enable reduced traffic and more efficient use of resources and bandwidth in a data distribution network when content is delivered to multiple communication devices and terminals of content consuming users. In the following description, the term "consuming nodes" will be used to represent any such communication devices and terminals to which content can be delivered over the data distribution network. A consuming node is thus a termination point in the network for the delivered content. Originally, content is delivered from a "source node" controlled and operated by a content provider, and the content, in the form of encoded data, is often transferred via a plurality of intermediate nodes in the network, using a suitable transport protocol, before reaching a terminating consumer node. These intermediate nodes merely act as data relaying nodes and the data traffic through them and over their connecting links may sometimes be considerable thus causing quite high load and even congestion in the network.

It has been understood in this solution that several duplicated downstream data flows may occur from one node to another in the delivery path, where all these flows comprise data of the same content which is delivered roughly at the same time to multiple consuming nodes having requested that particular content. For example, a node in the network, operating as a delivering node of the content for multiple consuming nodes, may establish a downstream data flow towards each one of the consuming nodes and these data flows may be routed over the same intermediate node in the network before branching out towards the different consuming nodes. The content is thus distributed to multiple consuming nodes in a multi-cast manner, meaning that users are "watching" or "subscribing" to the same content at roughly the same time. In this context, "roughly" may imply that the difference in time between the data flows does not exceed a maximum time which may be limited by the type of content and the size of data storage used in the nodes involved.

In this disclosure, the term "delivering node" is defined as a node in a data distribution network that delivers content by repeatedly receiving and processing data requests from a downstream consuming node and sending the requested data in chunks to the consuming node in response thereto, which process is repeated over and over for successive data chunks of the content, thus generating the data flow, until all the content has been delivered. A session is thus established and maintained between the delivering node and the consuming node for the data flow.

The data distribution network topology for this particular content can be identified as a tree structure with the delivering node as a root and the multiple consuming nodes as leaves of the tree which are connected to the delivering node via various intermediate nodes, thus forming different distribution paths to the consuming nodes. The nodes in such a network may also be denoted "parents" (i.e. upstream nodes) and "children" (i.e. downstream nodes) depending on their positions relative one another. The tree structure or network topology of such a distribution pattern of a particular content may be referred to as a "distribution tree". Even though the content is distributed over a network which can be represented as a more or less fully connected graph, i.e. all nodes are connected to one another, it is possible and practical to reduce the full graph to a tree, hence the distribution tree, typically having one source node of the content provider and many sinks being the consuming nodes of end-users at various locations around the world. Methods have been developed as such for identifying such a distribution tree, which are not necessary to describe here in detail for understanding of the solution.

Even though the consuming nodes are connected at different locations in the network, the data flows thereto may take the same route from one node to another such that all the data flows of the same content are routed over one particular downstream data relaying node that is connected to the delivering node. In this case, multiple data flows of the same content occur over the same link between these two nodes thus causing redundancy by occupying multiple duplicated resources for the same purpose, i.e. to send the same content in multiple equal data flows within a limited time span over the same link from the delivering node to the downstream data relaying node. In this solution, it is devised that these multiple data flows of the same content between two nodes can be reduced to a single common data flow and still get the needed data across this link which is achieved by delegating the function of delivering node to the next downstream node. In this way, the content can be delivered to all consuming nodes but with less occupation of resources and potentially also with reduced latency. This can be accomplished by a method and a first node as follows.

A first example of how this solution can be realized in a first node to reduce load and latency in a data distribution network, will now be described with reference to the flow chart in FIG. 1. This figure illustrates a procedure that is performed by the first node for distributing a particular content, referred to as a "first" content, to multiple consuming nodes connected to the data distribution network. It is assumed that the first node initially operates as delivering node of the first content for the consuming nodes, i.e. it sends successive chunks of data of the content to the consuming nodes in response to requests therefrom in different sessions, thus generating corresponding data flows.

In a first shown action 100, the first node detects multiple data flows of the first content from the first node to a second node in the distribution network. The second node is thus a downstream node, or child, relative the first node in the distribution tree for this content. The detected data flows are transferred approximately at the same time but separately and independent of each other to the different consuming nodes and the first node detects that they all pass through the second node. The first node may be a source node controlled by a provider of the first content, or a node further down the distribution network topology which node is currently acting as delivering node. In the latter case, the first node may have cached the first content when received from a source node, at some point, to shorten the delivery path if that content is frequently demanded by consuming nodes, which is a commonly used procedure in the field of content delivery as described above.

For each one of these data flows there is an ongoing request—response process, as described above, between the first node and the respective consuming nodes for delivering the successive chunks of data. Each such process and data flow require usage of resources in the first and second nodes as well as bandwidth for transport of data, which are thus basically the same in all the detected data flows between the first and second nodes, generating considerable resource and bandwidth consumption. These parallel data flows can be reduced to a single common data flow between the first and second nodes in the following actions, thus saving much of these resources and bandwidth. The first node thus effectively detects in this action that there is redundancy downstream in the distribution tree, i.e. at least in the communication with the second node.

The second node may be identified based on knowledge of the tree-shaped topology of the data distribution network pertaining to delivery of the first content and further based on knowledge of locations of the consuming nodes in this topology or distribution tree. Having identified the second node as being a common data relaying node for the multiple data flows in action 100, the first node instructs the second node to operate as delivering node of the first content for the consuming nodes, in a further action 102. This instruction to operate as delivering node can be made in several different ways. For example, in a cloud environment the first node may initiate creation of a VM or similar functionality in the second node of executing the role of delivering node, or this functionality may already be implemented in the second node, which alternatives will be elaborated in more detail later below.

In a following action 104, the first node also redirects the consuming nodes to use the second node as delivering node of the first content, i.e. instead of using the first node as their delivering node. As a result, the consuming nodes receiving the respective data flows will establish sessions with the second node and send their data requests thereto instead of to the first node, which means that the delivery path has automatically been shortened by reducing the number of transfer steps by at least one, or even more if there is one or more intermediate nodes between the first and second nodes. In a further action 106, the first node also reduces the multiple data flows to a common data flow of the first content to the second node, thereby saving bandwidth and eliminating the redundancy over the link between the first and second nodes. Also, processing resources are saved in both nodes by reducing the number of data flows to a single data flow.

Figure 2:
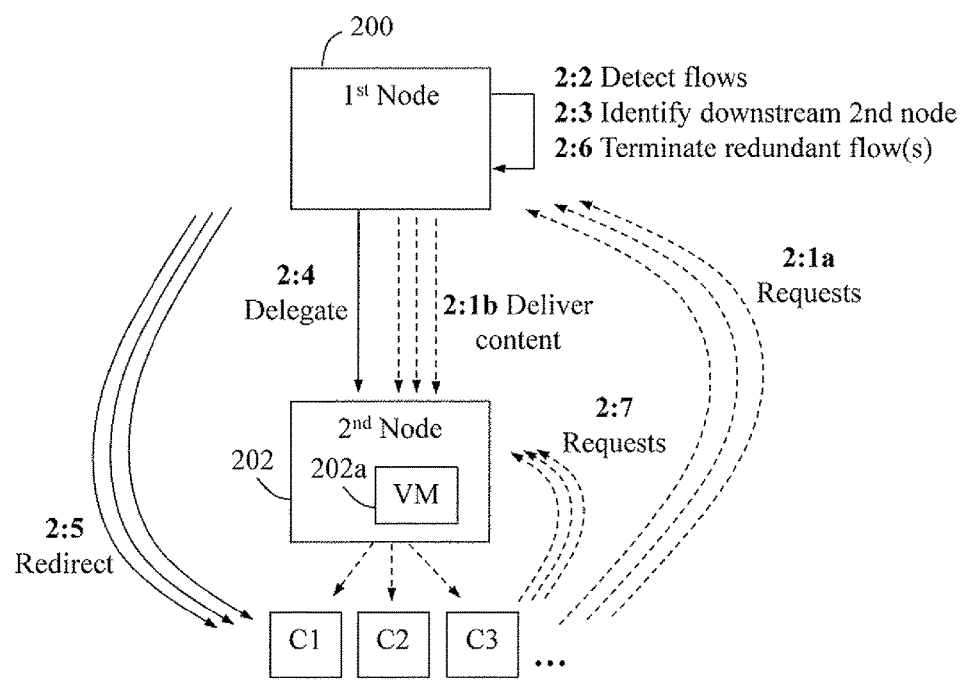
FIG. 2 is a block diagram illustrating a communication scenario in a data distribution network, according to further possible embodiments.

The above-described procedure is further illustrated by another example shown in the block diagram of FIG. 2, where a first node 200 delegates the function of delivering node to a second node 202, for distributing content to multiple consuming nodes C1, C2, C3, . . . A first action 2:1$a$ illustrates that each of the consuming nodes C1, C2, C3, . . . repeatedly sends requests for data of a first content to the first node 200 which responds by sending successive chunks of data of the content to the consuming nodes in another action 2:1$b$ in multiple parallel but independent data flows and sessions. Actions 2:1$a$ and 2:1$b$ thus illustrate the parts of an ongoing session of request—response for each consuming node as described above.

In another action 2:2, the first node 200 detects that there are multiple parallel ongoing downstream data flows of the same content roughly at the same time. The first node 200 also identifies the downstream second node 202 to which all the data flows are directed, in a further action 2:3, e.g. based on knowledge of the topology of the distribution tree in the data distribution network and of the locations of the consuming nodes, as described above. The first node 200 then sends an instruction to the second node 202 to operate as delivering node of the first content for the consuming nodes, thus effectively delegating the function of delivering node, as shown in an action 2:4. This delegation of delivery function can be made in different ways, to be described later below. For example, a VM 202$a$ may be established in the second node 202 which is basically configured to cause the second node 202 to operate as delivering node by receiving and processing data requests from the consuming nodes, among other things. The VM 202$a$ may be "tailor-made" with enough capacity and functionality to meet the demands from the consuming nodes which makes the solution "elastic", i.e. adaptable and flexible.

The first node 200 also redirects the consuming nodes C1, C2, C3, . . . to use the second node as delivering node of the first content, as shown in another action 2:5. In this action, the first node 200 may send a redirect message to each and all of the consuming nodes asking them to send their requests for data to the second node 202 instead of the first node 200. In another action 2:6, the first node 200 further terminates any redundant data flows of the content sent downstreams to the second node 202, leaving just one common, or shared, data flow to the second node 202 which the latter can used for delivering data of the content further downstreams towards the individual consuming nodes C1, C2, C3, . . . in response to data requests from the consuming nodes, as of action 2:7. Thereby, the data flows start from the second node 202 instead of the first node 200 with one transfer step less than before.

Some further optional embodiments are possible when performing the procedures depicted in FIG. 1 and FIG. 2. For example, the second node may be identified as a "lowest" downstream node forwarding the detected multiple data flows in the distribution tree, i.e., the second node is located as close as possible to the consuming nodes. Thus, it is possible to delegate the delivering function to a node, which is located anywhere in the distribution tree and which is not necessarily the next child node directly connected to the first node. In another possible embodiment, identifying the second node may comprise applying the so-called Dijkstra's algorithm for determining the shortest possible path from the first node to each of the consuming nodes in the topology, which will be elaborated further below. Dijkstra's algorithm is just an example that can be used in this context and any other suitable algorithm or procedure may be used for determining the abovementioned shortest possible path.

In another possible embodiment, detecting the multiple data flows may comprise detecting, by the first node, that the number of the data flows is above a first threshold. For example, it may be deemed unnecessary or unwarranted to delegate the function of delivering node to the second node when there are relatively few redundant data flows, i.e. less than the first threshold, which altogether do not burden the network and resources therein in a way that has any notable harmful impact on the network capacity. This threshold may be set by a network operator, e.g. in consideration of network capacity and topology. The first threshold may further be node-specific, i.e. different for different nodes, e.g. in consideration of capacity of that node and/or its position in the network topology. In general, when the first threshold has been set to x, the function of delivering node should be delegated downstreams whenever x+1 or more data flows of the same content are detected.

In another possible embodiment, the delivering node may be disabled in the second node when detecting that the number of data flows of the first content is lower than a second threshold. In general, when the second threshold has been set to y, the function of delivering node should thus be disabled whenever no more than y−1 data flows of the same content are detected. Further, disabling the delivering node may comprise redirecting the remaining consuming node(s) to use the first node again as delivering node of the first content.

As mentioned above, the above action of instructing the second node to operate as delivering node of the first content can be made in several different ways, for example by establishing or creating a VM in the second node of executing the role of delivering node. In a first example, the first and second nodes may be part of a cloud environment which includes a so-called "cloud manager" which is a single node operative for creating and managing virtual resources in the cloud. In this case, the first node may send a request to the cloud manager to create a VM in the second node, thus indicating at which location the VM shall be created. Then, the first node receives a notification from the cloud manager indicating that the new VM has been activated and is up and running in the second node. The notification also comprises contact information of the VM such as an IP address. The first node is then able to instruct the new VM in the second node to operate as delivering node of the first content in question for a set of consuming nodes, also informing which parent node the second node has in the distribution tree, and to redirect the consuming nodes to the second node.

In a second example, the first node may contact a control function, such as a so-called "hypervisor" or the like, in the second node to create a new VM directly in the second node, i.e. without involving a cloud manager. The first node then detects when the new VM is up and running, e.g. by receiving a notification from the hypervisor of the second node. The first node is then able to instruct the new VM in the second node to operate as delivering node of the first content for the consuming nodes, also informing which parent node the second node has in the distribution tree, and to redirect the consuming nodes to the second node.

In a third example, the second node has already been configured with software required to operate as delivering node. In that case, the first node can directly instruct the second node to run this software to operate as delivering node of the first content for the consuming nodes, also informing which parent node the second node has in the distribution tree. The latter example may be practiced also in a non-cloud environment.

Some examples of how delegation of the function of delivering node can propagate downstreams in several steps in a distribution tree, and how this function can be disabled in a node, will now be described with reference to FIGS. 3a-f. In these examples, it is assumed that the above-described first threshold has been set to one, meaning that the function of delivering node is delegated downstreams whenever two or more data flows of the same content are detected.

Figure 3A:
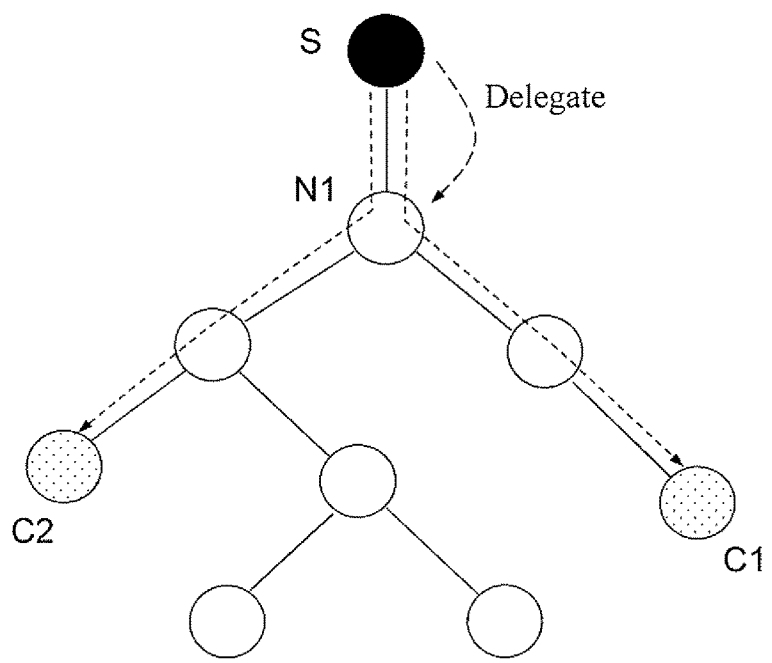
FIGS. 3a-f are schematic diagrams illustrating how delivery of content can automatically be made more efficient in a data distribution network, according to further possible embodiments.
Figure 3B:
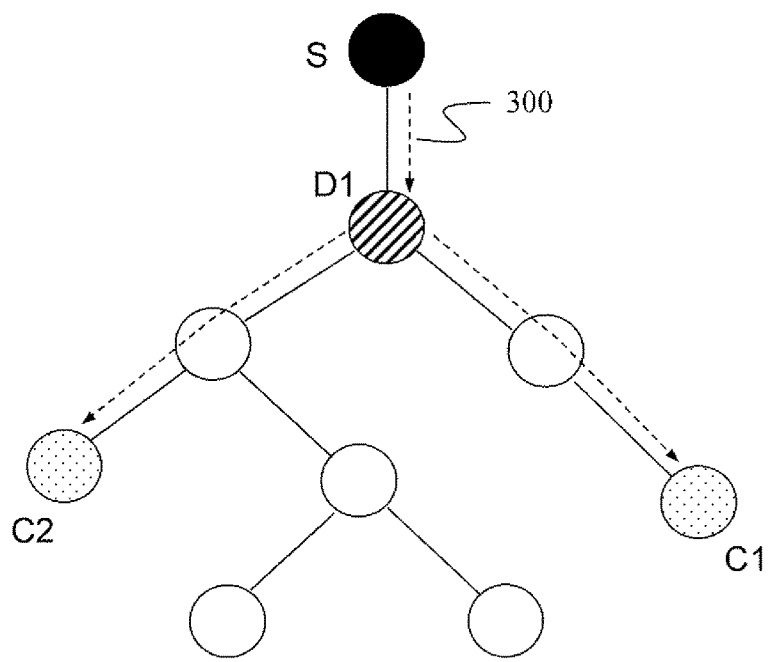

Starting with FIG. 3a, "S" denotes a source node operated by a content provider from which a first content is initially sent. "C1" and "C2" denote two consuming nodes which are currently watching the same content roughly at the same time. The source node S initially operates as delivering node of the first content and detects two parallel data flows of the first content towards C1 and C2, respectively, illustrated as two dotted arrows: one from S to C1 and one from S to C2. The source node S also identifies a downstream node denoted "N1" through which both streams are routed. Thus, N1 is identified as the lowest downstream node in the distribution tree that forwards the two data flows in the topology. It should be noted that both data flows may be routed over one or more further nodes present between the nodes S1 and N1, although not shown here for simplicity.

Having detected the two data flows and identified N1, the delivering node S delegates its delivery function for C1 and C2 to node N1, which may be done according to any of the above-described procedures of FIG. 1 and FIG. 2. As a result, node N1, which until now has only acted as a data relaying node, now starts to act as a delivering node, thus denoted "D1" in the next FIG. 2b. Further, the source node S has terminated any redundant data flow by reducing the two flows to a single common flow 300 as illustrated by a single dashed arrow from S to D1 in FIG. 3b. D1 thus receives the content data from node S over the common flow and distributes the same data in two separate data flows towards C1 and C2, respectively, as illustrated by two dotted arrows: one from D1 to C1 and one from D1 to C2. Compared to FIG. 3a, these delivery paths have been shortened by (at least) one step and a redundant data flow has been eliminated from S to D1.

Figure 3C:
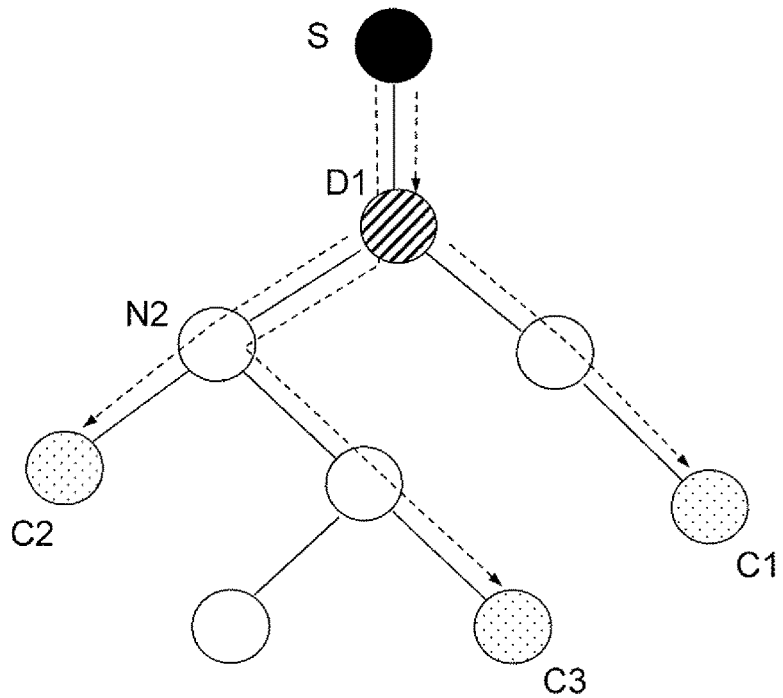

In the next FIG. 3c, another consuming node "C3" has started to request and receive the same first content from the source node S, as illustrated by a new dashed arrow from S to C3 routed over D1. In this case, the source node S delegates this delivery of the content to D1. Further, the delivering node D1 detects that there are two data flows of the first content being sent independently over a downstream child node denoted "N2": the new flow to C3 and the flow to C2 previously delegated to D1.

Figure 3D:
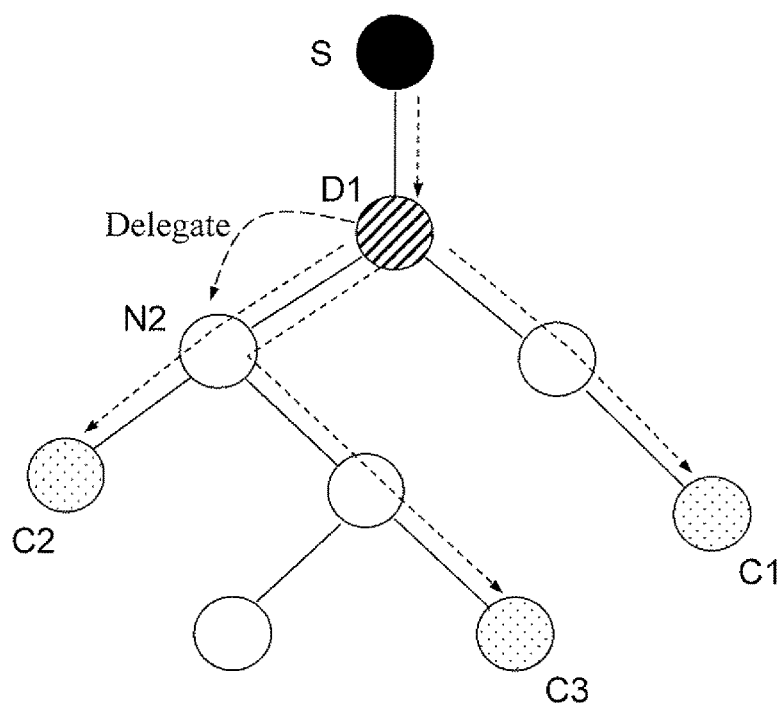
Figure 3E:
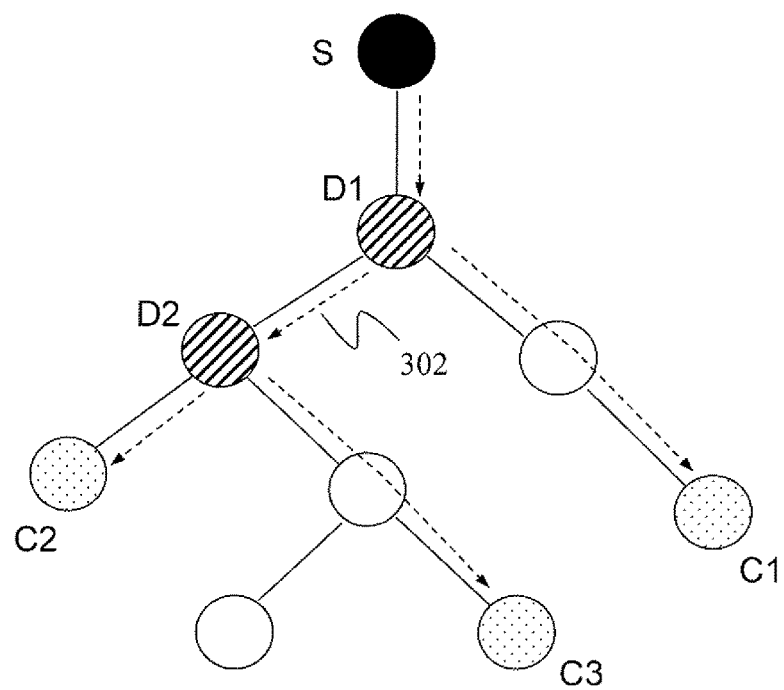

Therefore, the delivering node D1 delegates its delivery function for C2 and C3 to node N2, e.g. according to any of FIG. 1 and FIG. 2, as indicated in FIG. 3d. As a result, node N2, which until now has only acted as a data relaying node, starts to act as a delivering node, thus denoted "D2" in the next FIG. 3e. Further, the delivering node D1 has terminated any redundant data flow by reducing the two flows to a single common flow 302 to D2 as illustrated by a single dashed arrow from D1 to D2 in FIG. 3e. D2 thus receives the content data from node D1 over the common data flow 302 and distributes the same data in two separate data flows towards C2 and C3, respectively, as illustrated by two dotted arrows: one from D2 to C2 and one from D2 to C3. Compared to FIG. 3c, these delivery paths have been shortened by (at least) one further step and a redundant data flow has been eliminated from D1 to D2.

Figure 3F:
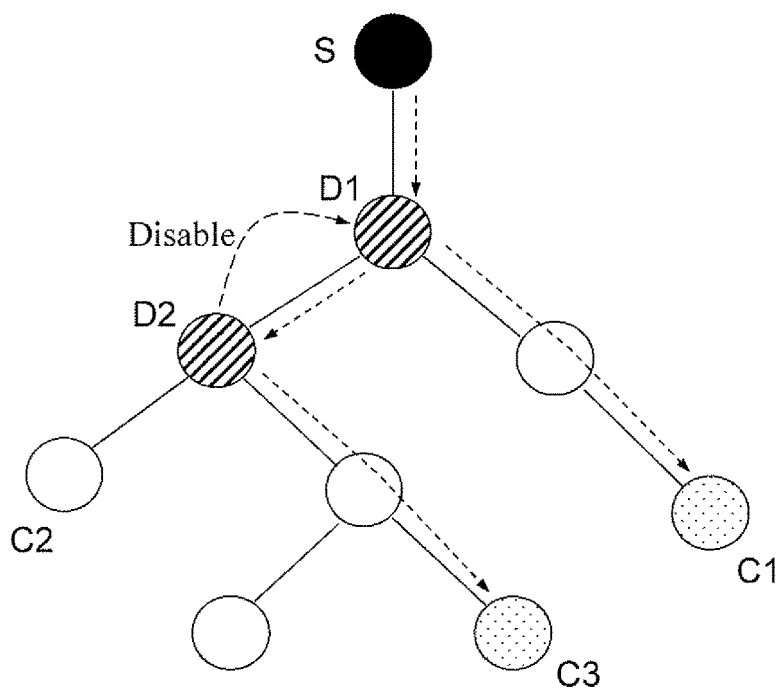

The next FIG. 3f illustrates that the delivering node D2 detects that the data flow to C2 has been terminated and disables itself as delivering node since it is no longer necessary to operate as delivering node for a single data flow, i.e. to C3. In general, the delivering node may be disabled in D2 when detecting that the number of data flows of the first content is lower than a second threshold which in this example is set to two. So when the second threshold has generally been set to y, the function of delivering node should be disabled whenever y–1 or less data flows of the same content are detected. Further, disabling the delivering node may comprise redirecting the remaining consuming node(s) to use the first node as delivering node of the first content.

Figure 4:
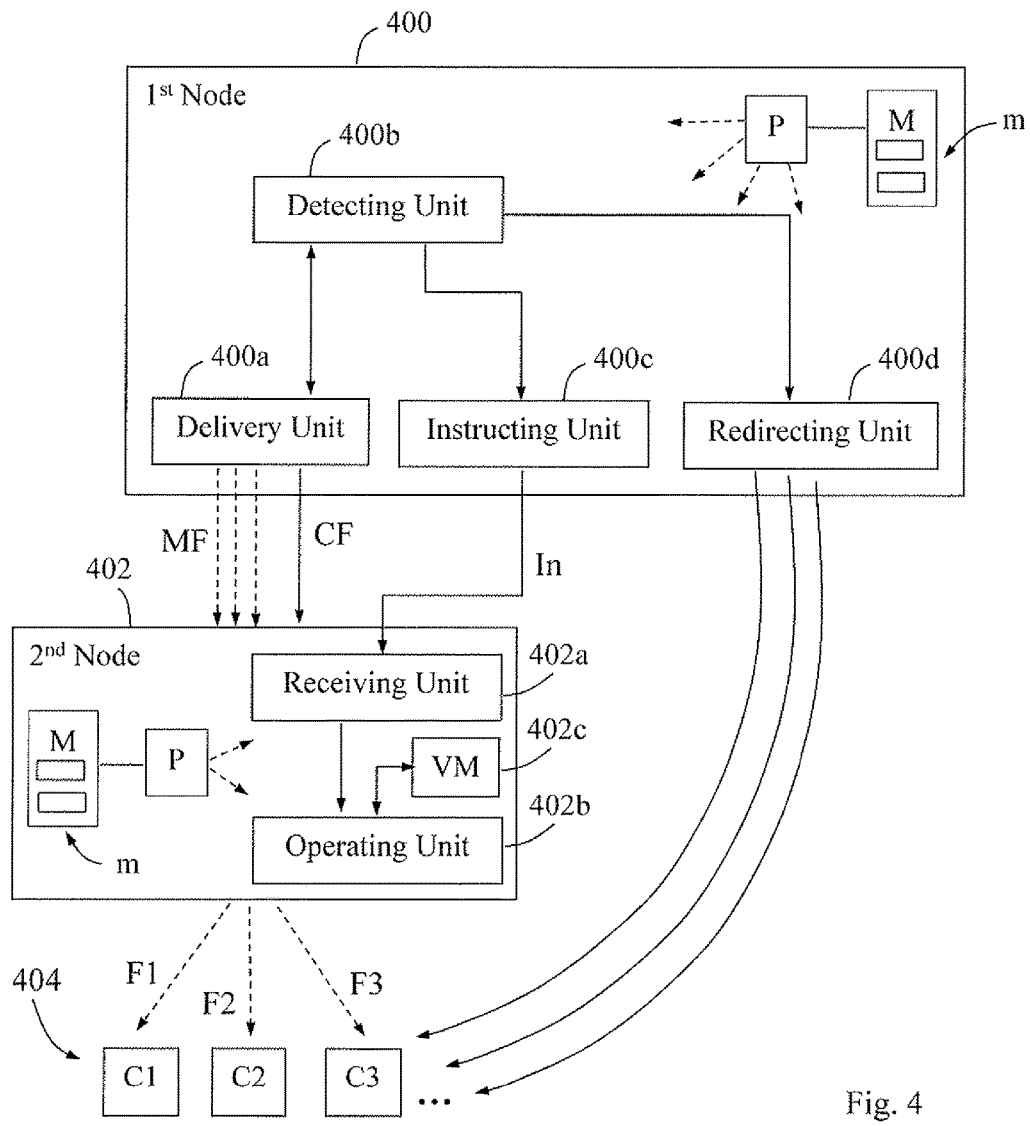
FIG. 4 is a block diagram illustrating a first node and a second node in more detail, according to further possible embodiments.

A detailed but non-limiting example of how a first node and a second node of a data distribution network may be structured with some possible functional units to bring about the above-described operation of the first and second nodes, respectively, for distributing content to multiple consuming nodes, is illustrated by the block diagram in FIG. 4.

The first node 400 comprises a delivery unit 400a adapted to send data flows with content over the distribution network. The first node 400 further comprises a detecting unit 400b adapted to detect multiple data flows "MF" of a first content from the first node 400 to a second node 402 in the distribution network when the first node 400 operates as delivering node of the first content for a set of consuming nodes 404.

The first node 400 also comprises an instructing unit 400c adapted to instruct the second node 402 to operate as delivering node of the first content for the consuming nodes 404. The first node 400 further comprises a redirecting unit 400d adapted to redirect the consuming nodes 404 to use the second node 402 as delivering node of the first content. The delivery unit 400a is adapted to reduce the multiple data flows to a common data flow "CF" of the first content to the second node 402.

The above first node 400 and its functional units 400a-d may be configured or adapted to operate according to various optional embodiments. In a possible embodiment, the detecting unit 400b may be adapted to identify the second node 402 based on knowledge of a tree-shaped topology of the data distribution network pertaining to delivery of the first content and further based on knowledge of locations of said consuming nodes in the topology. In that case, the detecting unit 400b may be further adapted to identify the second node as a lowest downstream node forwarding said data flows in the topology, i.e., such that the second node is located as close as possible to the consuming nodes. The detecting unit 400b may also be adapted to identify the second node by applying Dijkstra's algorithm for determining the shortest possible path from the first node to each of the consuming nodes in the topology.

In another possible embodiment,

The second node 402 comprises a receiving unit 402a adapted to receive an instruction "In" from the first node 400 in the data distribution network to operate as delivering node of a first content for the consuming nodes when multiple data flows MF of the first content to the second node 402 have been detected in the first node 400. The second node 402 also comprises an operating unit 402b adapted to operate as delivering node of the first content by sending multiple data flows F1, F2, F3, . . . to the consuming nodes 404 while a common data flow CF of the first content is received from the first node 400.

The above second node 402 and its functional units 402a and 402b may be configured or adapted to operate according to various optional embodiments. In a possible embodiment, the operating unit 402b may be adapted to disable the delivering node in the second node when detecting that the number of data flows of the first content is lower than a second threshold. In that case, the operating unit may further be adapted to redirect the consuming nodes to use the first node as delivering node of the first content when disabling the delivering node in the second node.

In another possible embodiment, the detecting unit 400b may be adapted to detect the multiple data flows by detecting that the number of said data flows is above a first threshold. In yet another possible embodiment, when the first and second nodes are part of a cloud environment, the instructing unit 400c may be adapted to instruct the second node to operate as delivering node by creating a virtual machine VM 402c in the second node 402 for executing the role of delivering node.

Figure 5:
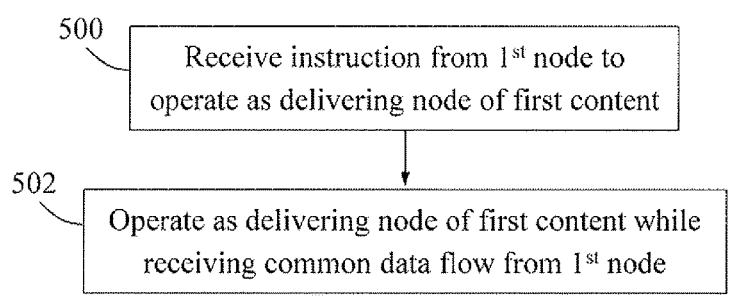
FIG. 5 is a flow chart illustrating a procedure in a second node of a data distribution network, according to further possible embodiments.

An example of how this solution can be realized in a second node, being connected to a first node, to reduce load and latency in a data distribution network, will now be described with reference to the flow chart in FIG. 5. This figure illustrates a procedure that is performed by the second node for distributing a particular content, referred to as a "first" content, to multiple consuming nodes connected to the data distribution network. It is assumed that the first node initially operates as delivering node of the first content for the consuming nodes, i.e. it sends successive chunks of data of the content to the consuming nodes in response to requests therefrom in separate sessions, thus generating corresponding data flows.

In a first shown action 500, the second node receives an instruction from the first node in the data distribution network to operate as delivering node of a first content for the consuming nodes when multiple data flows of the first content to the second node have been detected in the first node. This action corresponds to actions 102 and 2:4 above. In a further action 502, the second node accordingly operates as delivering node of the first content by sending multiple data flows to the consuming nodes while a common data flow of the first content is received from the first node. This action corresponds to action 2:7 above.

It should be noted that FIG. 4 illustrates various functional units in the first and second nodes 400, 402 and the skilled person is able to implement these functional units in practice using suitable software and hardware. Thus, the solution is generally not limited to the shown structures of the first and second nodes 400, 402, and the functional units 400a-d and 402a-b may be configured to operate according to any of the features described in this disclosure, where appropriate.

The functional units 400a-d and 402a-b described above can be implemented in the first and second nodes 400, 402, respectively, by means of program modules of a respective computer program comprising code means which, when run by a processor "P" in each node causes the first and second nodes 400, 402 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the first and second nodes 400, 402 in the form of a memory "M" having a computer readable medium and being connected to the processor P. The computer program product or memory M in each node 400, 402 thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the first and second nodes 400, 402.

Procedures have been described for finding redundant data flows and calculating where in the distribution tree it is suitable to create and/or disable the function of delivering content, i.e. by delegating and disabling a delivering node as described above, in order to minimize this redundancy. A decision making process for this can be made in a hierarchical manner where each node in a distributed cloud is responsible for optimizing resources below it in the distribution tree. Each node in the distributed cloud may be given the authority to create and disable delivering nodes in the cloud, including disabling itself if needed, when appropriate, e.g. as controlled by the above-mentioned first and second thresholds.

Virtual machines in a cloud environment are normally created through user interaction, e.g. to provide login credentials to a dashboard or control interface where the user can control creation and management of virtual machines. In the solution presented in this disclosure, however, the necessary user intervention has been eliminated or at least reduced. An application which is bootstrapped initially by a controlling user may be given full credentials in order to act automatically on behalf of the user in order to autonomously create and disable delivering nodes when it is warranted.

The task of finding redundant data flows in the network is given to each data relaying node of the network so that it detects if there is redundancy at some location downstreams in the tree. This may be done simply by looking over a certain limited time-period how many unique consuming nodes, or children, as identified by their IP addresses, have accessed the same content during the considered time-period, thus "roughly at the same time". When the number of children consuming the same content within the given time frame exceeds a certain pre-configured value, i.e. the first threshold, the data relaying node has detected redundant traffic flows which potentially could be optimized by delegation of the delivering function.

An algorithm that can be used for finding out whether the network can be optimized by delegation of the delivering function may be the algorithm known as the "Longest Common Path" calculation. First, it applies the above-mentioned Dijkstra's algorithm for calculating the shortest paths from the source node over the data relaying node and towards the consuming nodes, i.e., all the children that has requested the same content within the given time period.

Given all the shortest paths, the algorithm then attempts to "walk down" the paths step by step towards all the consuming nodes, for each step keeping track of how many children nodes still remain below. Initially, the set of children comprises all the consuming nodes that has requested the same content and for each time a branch is observed when following the shortest paths towards the children, the children are removed from the set and the search is continued down all the branches until, eventually, the set is reduced to contain only one child. The algorithm outputs a set of branching locations in the network where data flows are being split in different directions, and all these branching locations could potentially be suitable for creating new delivering nodes as they could reduce redundancy in the network.

Figure 6A:
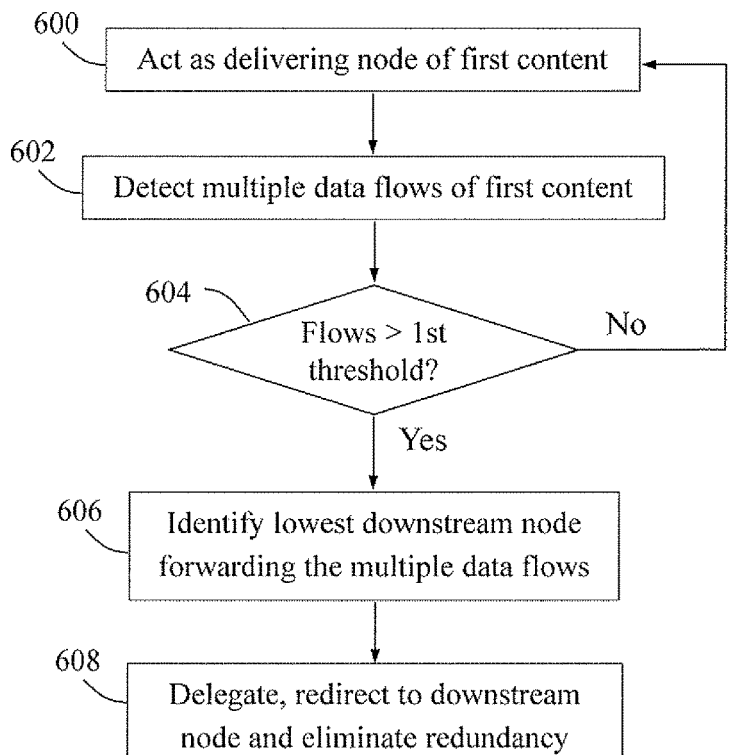
FIGS. 6a and 6b are flow charts illustrating procedures in a first node and a second node, respectively, according to further possible embodiments.
Figure 6B:
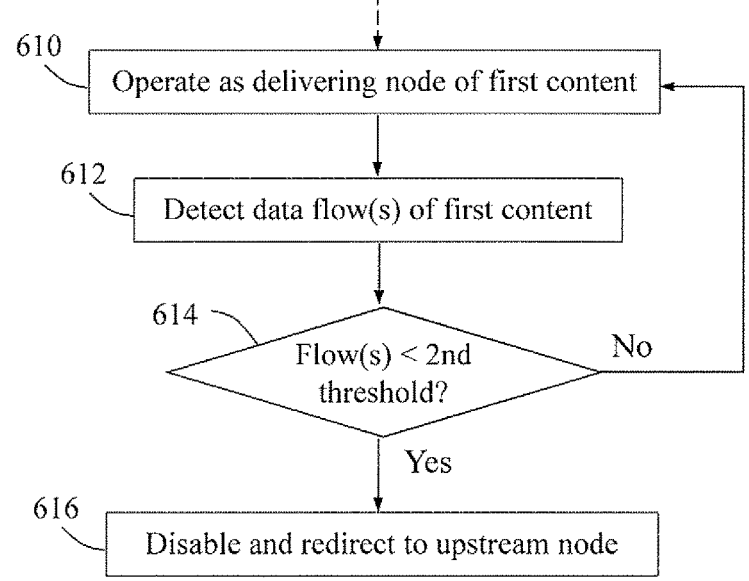

A more detailed example of how the above-described first and second nodes may act when distributing content to multiple consuming nodes connected to the data distribution network, will now be described with reference to the flow charts in FIGS. 6a and 6b. FIG. 6a shows actions to be performed by the first node while FIG. 6b shows actions to be performed by the second node. In a first action 600, the first node acts as delivering node of the first content, e.g. when being a source node or a previously appointed delivering node. In a next shown action 602, the first node detects multiple data flows of the first content, e.g. basically as described for actions 100 and 2:2 above.

The first node then determines whether the number of detected data flows is above a first threshold, in an action 604. If not, the process may return to action 600 where the first node continues to act as delivering node. On the other hand, if the number of detected data flows is above the first threshold, the first node identifies the lowest downstream node that forwards the detected multiple data flows, in this case the second node, in an action 606, e.g. basically as described for action 2:3 above. The first node then delegates the delivering function by instructing the second node to operate as the delivering node, and redirects the consuming nodes to use the second node as their delivering node, in an action 608, e.g. basically as described for actions 102 and 2:4 above. In this action, redundancy is also eliminated by reducing the data flows from the first node to the second node to a common data flow of the first content.

Moving to FIG. 6b, the second node receives the instruction from the first node and then operates as delivering node of the first content according to the instruction from the first node, in another action 610. In a next shown action 612, the second node detects that there are one or more ongoing data flows of the first content to one or more of the consuming nodes, i.e. one or more of the sessions and data flows may have been terminated since the second node was delegated the role of delivering node. The second node thus determines, in a further action 614, whether the number of detected data flows is below a second threshold. If not, the process may return to action 610 where the second node continues to act as delivering node. On the other hand, if the number of detected data flows is below the second threshold, the second node disables the delivering node or function and redirects the remaining consuming node(s), still receiving a data flow of the first content, to use the upstream first node again as their delivering node, in a final shown action 616.

Some advantages that may be achieved when using any of the embodiments described herein include a self-organizing network for content distribution which automatically adapts the delivering operation to the prevailing situation of consuming nodes, which does not require any manual work or special supervision of the network. Further, capacity in the network such as resources and bandwidth can be utilized with greater efficiency by eliminating redundancy in terms of data flows and sessions between the nodes for distributing content.

While the solution has been described with reference to specific exemplary embodiments, the description is generally only intended to illustrate the inventive concept and should not be taken as limiting the scope of the solution. For example, the terms "data flow", "content", "delivering node", and "consuming node" have been used throughout this description, although any other corresponding entities, functions, and/or parameters could also be used having the features and characteristics described here. The solution is defined by the appended claims.

The invention claimed is:

1. A method performed by a first node in a data distribution network, for distributing content to multiple consuming nodes connected to the data distribution network, the method comprising:
    detecting multiple data flows of a first content from the first node to a second node in the distribution network when the first node operates as delivering node of the first content for the consuming nodes;
    instructing the second node to operate as delivering node of the first content for the consuming nodes;
    redirecting the consuming nodes to use the second node as delivering node of the first content; and
    reducing the multiple data flows to a common data flow of the first content to the second node.

2. The method of claim 1, further comprising identifying the second node based on knowledge of a tree-shaped topology of the data distribution network pertaining to delivery of the first content and further based on knowledge of locations of said consuming nodes in the topology.

3. The method of claim 2, wherein the second node is identified as a lowest downstream node forwarding said data flows in the topology, the second node being located as close as possible to the consuming nodes.

4. The method of claim 2, wherein identifying the second node comprises applying Dijkstra's algorithm for determining the shortest possible path from the first node to each of the consuming nodes in the topology.

5. The method of claim 1, wherein detecting the multiple data flows comprises detecting that the number of said data flows is above a first threshold.

6. The method of claim 1, wherein the first and second nodes are part of a cloud environment and the second node is instructed to operate as delivering node by creating a virtual machine in the second node for executing the role of delivering node.

7. A first node in a data distribution network, the first node being configured to distribute content to multiple consuming nodes connected to the data distribution network, the first node comprising processing circuitry configured to:
    send data flows with content over the distribution network;
    detect multiple data flows of a first content from the first node to a second node in the distribution network when the first node operates as delivering node of the first content for the consuming nodes;
    instruct the second node to operate as delivering node of the first content for the consuming nodes; and
    redirect the consuming nodes to use the second node as delivering node of the first content,
    wherein the processing circuitry is configured to reduce the multiple data flows to a common data flow of the first content to the second node.

8. A first node according to claim 7, wherein the processing circuitry is configured to identify the second node based on knowledge of a tree-shaped topology of the data distribution network pertaining to delivery of the first content and further based on knowledge of locations of said consuming nodes in the topology.

9. A first node according to claim 8, wherein the processing circuitry is configured to identify the second node as a lowest downstream node forwarding said data flows in the topology, the second node being located as close as possible to the consuming nodes.

10. A first node according to claim 8, wherein the processing circuitry is configured to identify the second node by applying Dijkstra's algorithm for determining the shortest possible path from the first node to each of the consuming nodes in the topology.

11. A first node according to claim 7, wherein the processing circuitry is configured to detect the multiple data flows by detecting that the number of said data flows is above a first threshold.

12. A first node according to claim 7, wherein the first and second nodes are part of a cloud environment, and the processing circuitry is configured to instruct the second node to operate as delivering node by creating a virtual machine in the second node for executing the role of delivering node.

13. A method performed by a second node in a data distribution network, for distributing content to multiple consuming nodes connected to the data distribution network, the method comprising:
    receiving an instruction from a first node in the data distribution network to operate as delivering node of a first content for the consuming nodes when multiple data flows of the first content to the second node have been detected in the first node; and
    operating as delivering node of the first content by sending multiple data flows to the consuming nodes while a common data flow of the first content is received from the first node.

14. The method of claim 13, further comprising disabling the delivering node in the second node when detecting that the number of data flows of the first content is lower than a second threshold.

15. The method of claim 14, wherein disabling the delivering node comprises redirecting the consuming nodes to use the first node as delivering node of the first content.

16. A second node in a data distribution network, the second node being configured to distribute content to multiple consuming nodes connected to the data distribution network, the second node comprising processing circuitry configured to:
    receive an instruction from a first node in the data distribution network to operate as delivering node of a first content for the consuming nodes when multiple data flows of the first content to the second node have been detected in the first node; and operate as delivering node of the first content by sending multiple data flows to the consuming nodes while a common data flow of the first content is received from the first node.

17. A second node according to claim 16, wherein the processing circuitry is configured to disable the delivering node in the second node when detecting that the number of data flows of the first content is lower than a second threshold.

18. A second node according to claim 17, wherein the processing circuitry is configured to redirect the consuming nodes to use the first node as delivering node of the first content when disabling the delivering node in the second node.

* * * * *